5993X
H. Aiken,
Saw-Set,
Patented May 24, 1830.
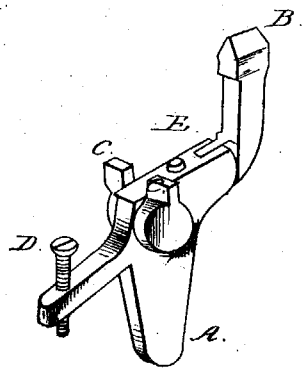
N. PETERS, PHOTO-LITHOGRAPHER, WASHINGTON, D. C.

Herrick Aiken
Letters Patent

The Schedule referred to in these Letters Patent, and making part of the same, containing a description in the words of the said Herrick Aiken, himself, of his improvement in the Saw Set.

This Saw set, consists of the following principal parts, Viz, 1st The Shank, 2nd The Hammer. 3d The Guards, 4th The Regulating Screw. 5th The Spiral Spring. 1st The Shank, is made with Iron and faced with Steel: It has two arms one to receive the hammer, & spiral Spring, and the other the regulating screw to be hereafter described. 2nd The Hammer is made of iron, with a steel point, and works with a rivet, in the arm of the shank. Its point is in the form of a wedge. 3d The guards are made of Iron, and placed one on each side of the Shank, so as to admit the Hammer to rise, and fall freely between them; they are connected together by a rivet passing thro' .. the Shank, and moved backwards and forwards, by a blow with a hammer. 4th The regulating screw is placed and works in the other arm of the shank, and is raised or lowered at pleasure by turning. There may be two or more holes for the screw, to answer for wider or narrower plates. 5th The spiral spring, is let into the arm under the hammer. Operation. The saw to be set, is laid upon the screw, which is lowered by turning to give the proper set. The points of the teeth rest against the guards, which are also fixed at a proper distance from the shoulder on the arm, over which the teeth are bent as a fulcrum. one or more blows are given on the hammer, directly over the tooth, which bends it to the required angle; the hammer rises a small distance by the Spiral Spring, but which spring may be dispensed with: one side of the saw being set, the other side is set in the same manner

What I claim as my invention, is the construction of the above described saw set.

For a further illustration of my invention, I refer to the model, and drawing of the same, deposited in the Patent Office. In

1896. X5993 testimony, that the foregoing is a true Specification of my invention. I have hereunto subscribed my name, before two witnesses, and made oath to the same, at the City of Washington, the 13th day of May 1830

Exd. Witnesses

1896. Wm. P. Elliot } Herrick Aiken

Ro. W. Finnerott }

(429 Mod.)

(Patented May 24. 1830)